May 6, 1924.

E. J. FARKAS 1,493,332

BALL BEARING CONSTRUCTION

Filed Feb. 28, 1920

Inventor
Eugene J. Farkas,
By
Attorneys

Patented May 6, 1924.

1,493,332

UNITED STATES PATENT OFFICE.

EUGENE J. FARKAS, OF DETROIT, MICHIGAN, ASSIGNOR, BY MESNE ASSIGNMENTS, TO FORD MOTOR COMPANY, OF HIGHLAND PARK, MICHIGAN, A CORPORATION OF DELAWARE.

BALL-BEARING CONSTRUCTION.

Application filed February 28, 1920. Serial No. 362,008.

*To all whom it may concern:*

Be it known that I, EUGENE J. FARKAS, a citizen of the present domain of Hungary, residing at Detroit, in the county of Wayne and State of Michigan, have invented certain new and useful Improvements in Ball-Bearing Constructions, of which the following is a specification, reference being had therein to the accompanying drawings.

This invention relates to improvements in ball bearing constructions, pertaining more particularly to constructions designed to support radial load and end thrust simultaneously.

In mechanical constructions, it is ofttimes the case that both radial and thrust load conditions are present concurrently. For instance, such conditions are generally present where a worm drive is employed, this being one example of such conditions, the thrust load conditions predominating over those of the radial load. It is oftentimes desirable that ball bearing constructions be employed for the purpose of meeting these conditions, and it is to this type of construction that the present invention relates.

Various expedients have been employed to meet these conditions, the general practice being to combine the effects of two different types of bearings, one designed to take care of radial load conditions, the other to the thrust load conditions. While attempts have been made to include structures for meeting both conditions within a single bearing, these attempts have been more or less unsuccessful, especially where the problem to be met includes the neccessity for taking care of thrust loads which may be exerted in either direction of length of the bearing axis.

The present invention is designed to meet these conditions, and in the particular embodiment disclosed to illustrate the invention, the construction is arranged to meet conditions such as to reach differential values between the loads as high as three to one in favor of the thrust load conditions. The invention is applicable for use under conditions of thrust load alone.

Other objects are to provide a construction which is simple and efficient in operation, durable in construction, and which can be manufactured at a relatively low cost.

To these and other ends therefore, the nature of which will be readily understood as the invention is hereinafter disclosed, said invention consists in the improved construction and combination of parts, hereinafter fully described, illustrated in the accompanying drawings, and more particularly pointed out in the appended claims.

Figure 2:
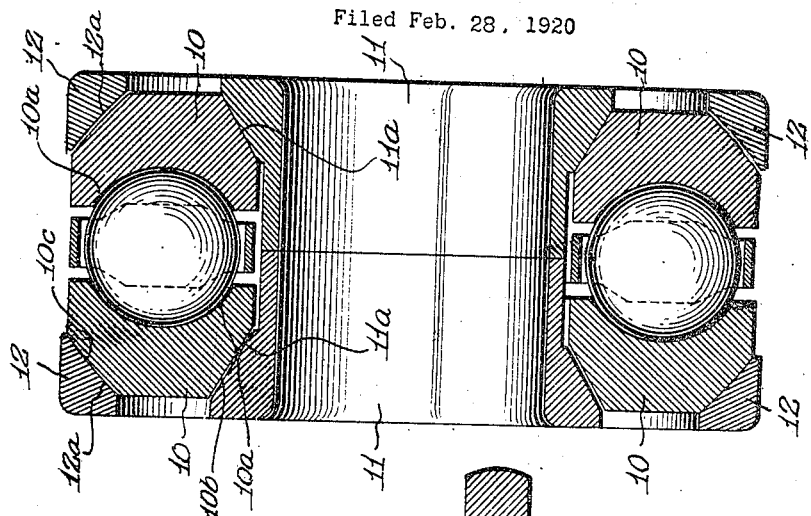
Figure 1:
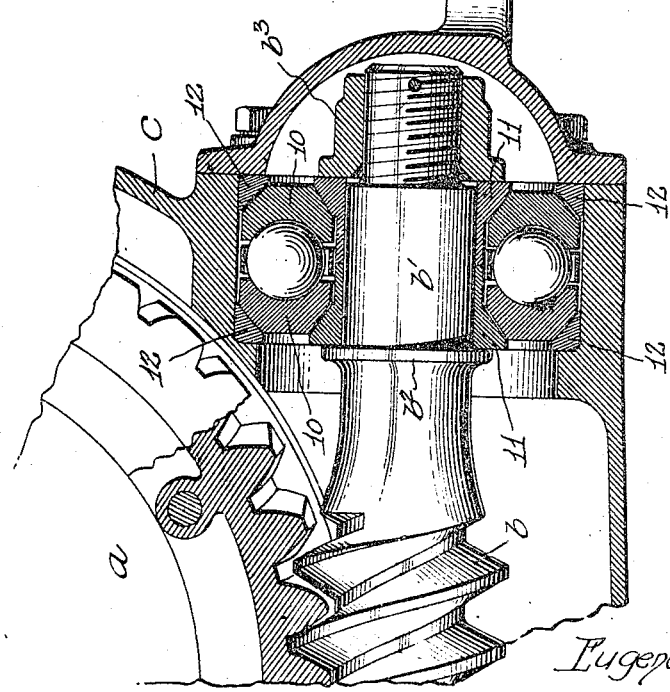

In the accompanying drawings in which similar reference characters denote similar parts in each of the views, Figure 1 is a view partly in section and partly in elevation of a portion of a worm drive construction, one embodiment of the present invention being shown as employed therein;

Fig. 2 is a sectional view on an enlarged scale taken diametrically through one of the structures, of the type shown in Fig. 1.

For the purpose of illustrating the general characteristics of the present invention, I have shown it as applied as the bearing structure used in the worm drive of a well known type of tractor construction, it being understood, of course, that this is illustrative only, the bearing being capable of use in connection with other forms of worm drive or other forms of mechanism in which end thrust conditions are found, particularly those wherein the end thrust may be in either direction of the axis of the bearing.

In Fig. 1, —*a*— indicates a worm gear, —*b*— a worm, and —*c*— a housing for these parts and which receives the bearing. As will be understood, rotation of the worm on one direction causes end thrust in one direction, while rotation of the worm in the opposite direction reverses the direction of end thrust, it being understood that the worm gear is the driven member in either case; in addition, there is present a radial load condition caused chiefly by the radial component of the tooth pressure. The ratio of end thrust to radial load is superior as to the thrust load conditions, and it is this general character of conditions that the present invention is especially designed to meet.

Referring to Fig. 2, which illustrates an embodiment of the present invention, designed to meet the conditions as shown in Fig. 1, 10 indicates two members of annular formation each carrying a ball groove $10^a$ and faces $10^b$ and $10^c$. These members are generally of similar characteristics but formed as "right" and "left," the two members in assembled relation, having the grooves $10^a$ opposing each other to produce an annular raceway, the major and minor diameters of one member being the same as in the other members; the same is true as to faces $10^b$ and $10^c$ so far as their positions relative to the axis of the members is concerned.

As will be seen, a line connecting the bottoms of grooves $10^a$ on a cross section of the assembly, would extend on a plane substantially parallel, with the axis of the bearing, so that the two members 10, with respect to the balls, take on the characteristics of the usual end thrust bearing in that the line drawn through the two points of contact of a ball extends in the direction of the axis of the bearing rather than transverse to such axis. As presently pointed out, this line of contact does not extend strictly in parallelism with the axis, but is more or less inclined to said axis, the inclination of such line of contact being shiftable to substantially opposite angles when the end thrust is shifted from one direction to the opposite direction.

To meet this condition, the race member grooves have a slightly larger radius than that of the ball. For instance, in one embodiment in which balls of 1.25 inches diameter are employed the radius of the race member groove is practically .645 inches, this particular bearing being designed for heavy duty work.

Members 10 are supported internally by an annular formation composed of two members 11, these members being in contact with each other at their inner edges, the inner diameters of these members being similar and being secured on to the part which is to be supported and which is subject to the end thrust action. For instance, in Fig. 1, these members 11 are mounted on the end portion $b'$ of the worm construction, this latter construction having a flange $b^2$ against which the outer edge of one of the members 11 abuts, the outer edge of the other member 11 contacting with a suitable nut or fastening device $b^3$ secured on the outer end of the worm construction, the result being that the two members 11 are clamped between the flange $b^2$ and the member $b^3$, thus fixedly securing the members 11 relative to the worm construction.

Members or elements 11 are each provided with an annular face $11^a$, these faces on a cross section of the elements being inclined to the axis of the elements, the direction of outward inclination being in the direction of increasing diameter of the element; in other words, the portion of greatest diameter of the inclined face is located at or adjacent to the outer edge of the element, the face decreasing in diameter in the direction of the inner edge of the element, the face, however, not extending to such inner edge.

The faces $11^a$ are complemental to the faces $10^b$ of members 10, and the relative position of the face $11^a$ on the member is such that, when the structure is assembled with the two members 11 in contact, as in Fig. 2, the distance between any circles of equal diameter of faces $11^a$ is slightly greater than the distance required to receive the portions of faces $10^b$ having the same diameter as said circles, the result being that when the bearing is assembled, there is a slight clearance between the faces $10^b$ and $11^a$ at one side of the ball race when the same faces are in contact on the opposite side of the ball race, the clearance being sufficient to permit relative movement between the members 10 and 11 on that side of the ball race in which the clearance is present.

The bearing is completed by the use of two annular members 12, these members 12 being of greater diameter than members 11 and, preferably have a larger external diameter than the similar diameter of members 10. Members 12 each have a face complemental to the face $10^c$ of the member 10 with which it is to cooperate, the face of member 12 being indicated at $12^a$.

While faces $11^a$ and $10^b$ are preferably straight and carry some of the characteristics of a cone, the faces $12^a$ and $10^b$, in cross sections of the members 10 and 12, are preferably curved, the radius of the arc preferably being greater than the radius of the assembled bearing, although it will be understood that the radius of this arc may vary to a considerable extent, the essential being that the faces $12^a$ and $10^b$ should vary, in cross section, from a straight line, being distinguished in this respect from the faces $11^a$ and $10^b$.

Members 12 are spaced apart, being located at the outer edges of the bearing, and the arrangement of faces $12^a$ is such that when the bearing is assembled with the outer edge of members 12 in alinement with the outer edges of members 11, the positions of the parts in the assembly, the same conditions relative to clearance will be present between faces $12^a$ as are present between faces $11^a$ and the corresponding faces of the two members 10.

As shown in Fig. 1, members 12 are located in housing —$c$— in such manner that the outer edges of these members will abut two shoulders carried by the housing, the particular arrangement shown being that one member abuts against an integral part of the housing while the other member abuts against a removable portion of the housing, a portion which when removed, permits of removal of the bearing itself. The shoulders, as provided by the housing construction are spaced apart a distance equal to the width of members 11. As a result this condition of clearance between faces 12$^a$ and 10$^c$ is made possible by reason of the fact that the two faces 12$^a$ are spaced apart a distance slightly greater than the corresponding portions of faces 10$^c$.

By this general arrangement certain definite results are attained when the bearing is in service. For instance, with the parts in the position shown in Fig. 1, it is assumed that the direction of worm rotation is such as to cause an end thrust towards the left, the result being that the pressure produced by this operation between the worm and worm gear in this direction tends to draw the worm towards the left and thus brings into contact the faces 10$^b$ and 11$^a$ at the right of the bearing, tending to move the members 10 and 11 carrying these faces towards the left. This, of course, tends to cause the balls to move in a similar direction and thus provides a pressure on member 10 at the left to move it toward the left, the result being that its face 10$^c$ is brought into contact with face 12$^a$ of member 12 at the left, the face 12$^a$ of this member being prevented from moving toward the left owing to the fact that such movement is prevented by reason of the contact of the member which carries the face with the fixed abutment of the housing. Consequently this thrust is resisted by this element or member 12 at the left acting on a line diagonal or inclined to the axis of the bearing, which line extends from member 12 at the left through the frictional contact of its face 12$^a$ with the face 10$^c$ of member 10 at the left, through the ball to member 10$^a$ at the right, and its face 10$^b$ coacting with face 11$^a$ of the member 11 at the right, the edge of this latter member being in contact with the securing member $b^3$.

Since, faces 11$^a$ are spaced from each other as are faces 12$^a$, the spacing being a distance greater than that required to contact concurrently with the complemental faces of members 10, it will be readily understood that with the end thrust in this direction, and with the line of contact such as indicated, member 10 at the left will be held stationary through the contact of its face 10$^c$ with member 12, while member 10 at the right will rotate with the form, due to the fact that this member is in frictional engagement with member 11 at the right, this latter member being movable with the worm. The presence of the clearance permits this control of the movement of the respective members 10, it being readily understood that while member 11 at the left and member 12 at the right are respectively rotating and stationary at this time, neither is effective on members 10 by reason of the fact that said members are held in proper bearing relation by reason of the line of contact before described.

If the direction of rotation of the worm be reversed the end thrust will be shifted to the opposite direction the result being that member 11 at the left will tend to move toward the right and thus shift the two members 10 and the interposed balls toward the right and producing the frictional contact of member 11 at the left and member 12 at the right with the interposed structure of members 10 and the balls, thus shifting the direction of resistance to thrust to a line which passes from member 11 at the left to member 10 at the left through the contact of the faces 11$^a$ and 10$^b$, the balls, of member 10 at the right to member 12 at the right through contact of their respective faces 10$^c$ and 12$^a$, the result being that the previous contacting faces are brought out of frictional engagement, and a frictional engagement is set up which permits member 10 at the left to rotate while member 10 at the right remains stationary, thus reversing the relations between the two members 10.

In each case, it will be understood, that the line of resistance extends in a direction inclined to the axis of the bearing and the direction of inclination shifts from one side to the other of the bearing concurrently with the shifting of direction of end thrust, the line of resistance, in each case, extending in a direction from the inner member 11 which receives the pressure produced by the thrust action, towards the diagonally opposite member 12 which provides the resistance to the thrust action, the direction of thrust action through the bearing thus being from a circle of smaller diameter toward a circle of larger diameter, thus producing a more uniform distribution of the thrust load and more efficient operation.

As will be understood, the active line of contact also takes up the radial loads, it being readily understood that while there is no direct support in a true radial direction, there will be an efficient operation where the installation is made under conditions such that the radial load is of decreased value relative to the thrust load, the conditions under which the bearing of the present invention is more particularly designed to operate.

As will be understood, the disclosure is of one embodiment only of the invention, it being readily seen that variations therein may be found desirable or essential in meeting the various exigencies of use, and I desire to be understood as reserving the right to make any and all such changes or modifications as may be found desirable or necessary, in so far as the same may fall within the spirit and scope of the invention as expressed in the accompanying claims, when broadly construed.

Having thus described my invention, what I claim is:

1. In ball bearing construction adapted for radial and thrust loads, a pair of annular axially alined race members having contact faces independent of the ball grooves, and means for supporting said members to meet service radial and thrust conditions, said means comprising annular elements having faces complemental to the member faces and positioned relative to the race members to permit frictional engagement between members and elements at either of two contact faces of each race member, said elements being arranged in pairs individual to the several race members, similar elements of the pairs being of similar cross-sectional configuration with the cross-sections in reverse relation to each other.

2. In ball bearing construction adapted for radial and thrust loads, a pair of annular axially alined race members having contact faces independent of the ball grooves, and means for supporting said members to meet service radial and thrust conditions, said means comprising annular elements having faces complemental to the member faces and positioned relative to the race members to permit frictional engagement between members and elements at either of two contact faces of each race member, said contact faces of each member being annular with cross-sections of the member having one of such faces inclined in direction relative to the other face, and one of said member faces having its cross-sectional length extending on a curved line.

3. In ball bearing construction adapted for radial and thrust loads, a pair of annular axially alined race members having contact faces independent of the ball grooves, and means for supporting said members to meet service radial and thrust conditions, said means comprising annular elements having faces complemental to the member faces and positioned relative to the race members to permit frictional engagement between members and elements at either of two contact faces of each race member, said contact faces of each member being annular with cross-sections of the member having one of such faces inclined in direction relative to the other face, and one of said member faces having its cross-sectional length extending on a curved line, having a greater radius than the major radius of the member.

4. In ball bearing construction adapted for radial and thrust loads, a pair of annular axially alined race members having contact faces independent of the ball grooves, and means for supporting said members to meet service radial and thrust conditions, said means comprising annular elements having faces complemental to the race member faces and positioned relative to the race members to permit frictional engagement between members and elements at either of two contact faces of each race member, said contact faces of each member being annular with cross-sections of the member having one of such faces inclined in direction relative to the other face, and one of said member faces having its cross-sectional length extending in a single plane, and having the similar length of its other face extending on a curved line.

5. In ball bearing construction adapted for radial and thrust loads, a pair of annular axially alined race members each having a pair of contact faces independent of the ball grooves, and means adapted to cooperate with such member faces for supporting said members to meet service radial and thrust conditions, said means including a pair of annular spaced-apart elements each having a face cooperative with one of the contact faces of its adjacent member, the cooperating faces of said elements and members having complemental configurations curved in the direction of length of a cross-section of the elements.

6. In ball bearing construction adapted for radial and thrust loads, a pair of annular axially alined race members each having a pair of contact faces independent of the ball grooves, and means adapted to cooperate with such member faces for supporting said members to meet service radial and thrust conditions, said means including a pair of annular spaced-part elements each having a face cooperative with one of the contact faces of its adjacent member, the cooperating faces of said elements and members having complemental configurations curved in the directions of length of a cross-section of the elements, with the radius of curvature of a face greater than that of the major radius of the element.

7. In ball bearing construction adapted for radial and thrust loads, a pair of annular axially alined race members each having a pair of contact faces independent of the ball grooves, and means adapted to cooperate with such member faces for supporting said members to meet service radial and thrust conditions, said means including an annular two-part symmetrical formation of less internal diameter than that of the internal diameter of the race members with the two parts in direct edge contact to present said formation as an element between the race members and the axis of the bearing, said formation also having spaced-apart faces inclined relatively to each other and to the axis of the formation on a cross-section of the formation, said faces being adapted to cooperate with complemental faces of the members.

8. In ball bearing construction adapted for radial and thrust loads, a pair of annular axially alined race members having contact faces independent of the ball grooves, and means adapted to cooperate with such member faces for supporting said members to meet service radial and thrust conditions, said means including an annular two-part symmetrical formation of less internal diameter than that of the internal diameter of the race members with the two parts in direct edge contact to present said formation as an element between the race members and the axis of the bearing, said formation also having spaced-apart faces inclined relatively to each other and to the axis of the formation on a cross-section of the formation, said faces being adapted to cooperate with complemental faces of the members, the spacing of the formation faces being such as to permit movement of the assembled members in the direction of member axis to provide selective co-operation of faces in the presence of end thrust condition.

9. In ball bearing construction adapted for radial and thrust loads, a pair of annular axially alined race members having contact faces independent of the ball grooves, and means adapted to cooperate with such member faces for supporting such members to meet service radial and thrust conditions, said means including an annular two-part symmetrical formation of less internal diameter than that of the internal diameter of the race members with the two parts in direct edge contact to present said formation as an element between the race members and the axis of the bearing, said formation also having spaced-apart faces inclined relatively to each other and to the axis of the formation on a cross-section of the formation, said faces being adapted to cooperate with complemental faces of the members, and a pair of spaced-apart annular elements each having a face adapted to cooperate with a second face of its adjacent member, said elements being located external of the members.

10. As a means for supporting shafts in position to compensate for radial and thrust load conditions, wherein the shaft is mounted within a ball-bearing construction, and wherein the ball bearing is mounted between collar-like elements carried by the shaft and in constant contact relation to the ball-bearing construction, a ball bearing construction, and a housing external of the construction and having constant contact relation with the ball bearing construction, said ball-bearing construction comprising a pair of annular axially alined race members having contact faces independent of the ball grooves, and means for supporting said members to meet service radial and thrust conditions, said means including annular elements having faces complemental to the member faces and positioned relative to the race members to permit frictional engagement between members and elements at either of two contact faces of each race member, two of said elements being internally positioned and of a combined axial length equal to the distance between the collar-like elements of the shaft.

In testimony whereof I affix my signature in the presence of two witnesses.

EUGENE J. FARKAS.

Witnesses:
J. EMMET HALL,
GERTRUDE LORD.